United States Patent Office 3,330,736
Patented July 11, 1967

3,330,736
FUEL CLUSTER FOR NUCLEAR REACTOR
Pierre Cousseran, Clamart, Jean-Marc Hassig, Orsay, and Roland Roche, Clamart, France, assignors to Commissariat a l'Energie Atomique, Paris, France
Filed June 28, 1965, Ser. No. 467,242
Claims priority, application France, July 10, 1964, 981,344
5 Claims. (Cl. 176—81)

This invention relates to fuel clusters for heterogeneous reactors which are cooled by circulation of fluid and especially by gas under pressure.

The invention is more especially concerned with a fuel element assembly of the type which is frequently referred-to as a "fuel cluster," in which the fuel material is divided into a group of parallel rods of small diameter, each rod or fuel element being enclosed in a can and attached to adjacent fuel elements by means of structural members which ensure the cohesion of the fuel cluster. These structural members must have sufficient strength and rigidity to offer resistance to certain mechanical and thermal stresses to which the cluster is subjected, and are usually provided with grappling means so as to permit the handling of the cluster, especially for the purpose of loading and unloading the fuel.

The structural members of fuel element clusters frequently consist of end grids and braces which are spaced along the fuel elements. The advantage of this solution lies in its simplicity, but is outweighed by serious drawbacks, in that the grids and braces cause substantial unitary pressure drops in the coolant flow and add an appreciable mass of neutron-absorbing material within the channel through which the coolant flows. Moreover, there still remains a danger of thermal instability since said grids and braces only support the fuel elements at intervals.

In order to overcome the disadvantages noted above, it has already been proposed to secure the fuel elements to each other, not only at certain levels, but along their entire length by means of webs arranged parallel to the axes of the fuel elements. The structural members which serve for the assembly of the fuel elements are in that case formed of fins which join the cans to each other. Clusters which make use of this arrangement are usually referred-to as "snow-crystal clusters."

The fabrication of a single-unit snow-crystal cluster gives rise to serious difficulties. Conventional machining processes are hardly practicable; in particular, the extrusion process is difficult to carry into effect in the case of the materials contemplated such as beryllium or zirconium alloys. This process results in high capital cost, even in the case of a seven-element cluster (namely one central fuel element and six peripheral elements having an angular spacing of 60°).

This invention is directed to the design concept of an improved fuel cluster, especially insofar as said cluster retains the advantages of the snow-crystal cluster while nevertheless being simpler in design.

With this object in view, the invention proposes a fuel cluster comprising a plurality of parallel fuel elements each consisting of a rod of fuel material enclosed in a can provided with fins which extend substantially along the full length of the fuel elements and which are directed along planes which pass through the axis of a fuel element (two adjacent fuel elements are provided with one pair of fins located on the line of extension of each other) and consist of removable means for rigidly coupling said pairs of fins.

In a preferred form of embodiment of the invention, the coupling means consist of members forming keys which are adapted to slide axially with the outer portions as considered in the radial direction of the fins which form a pair.

The sturdiness of the fuel cluster which is thus constructed is comparable with that of a single-unit snow-crystal cluster. Furthermore, all of the fuel elements are capable of sliding so as to compensate any differences in axial elongation while remaining supported at unvarying distances from each other. Unitary pressure drops are attenuated to a very appreciable extent and the mass of neutron-absorbing material which is necessary in order to maintain the geometry of the fuel cluster is smaller.

The invention further consists in other arrangements which can advantageously be employed in conjunction with those referred-to above but which can be employed independently thereof. All of these arrangements will become more readily apparent from a perusal of the following description of practical embodiments of the invention which are given solely by way of example and not in any limiting sense. The description refers to the accompanying drawings, in which:

FIG. 3 is a diagrammatic view in isometric perspective of three fuel elements assembled together by the coupling means shown in FIG. 2a;

Figure 2C:
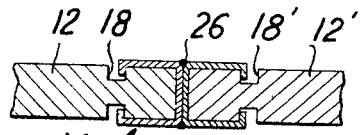
FIGS. 2a, 2b, 2c are detail views of a portion such as that which is designated by the reference A in FIG. 1, showing a number of alternative forms of embodiment of the coupling means wherein the connection between the two fins of one pair of fins is carried out by means of an external-fitting member.
Figure 2B:
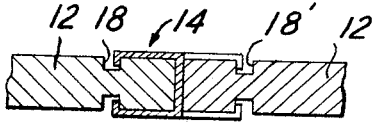
Figure 2A:
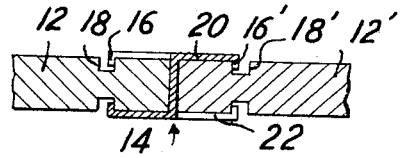
Figure 4C:
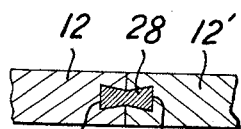
Figure 4B:
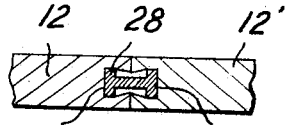
Figure 4A:
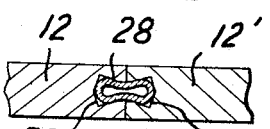

FIGS. 4a, 4b and 4c, which are similar to FIGS. 2a, 2b and 2c show alternative forms of embodiment of coupling means wherein the connection between the two fins of one pair is carried out by means of an internal-fitting member.

Figure 1:
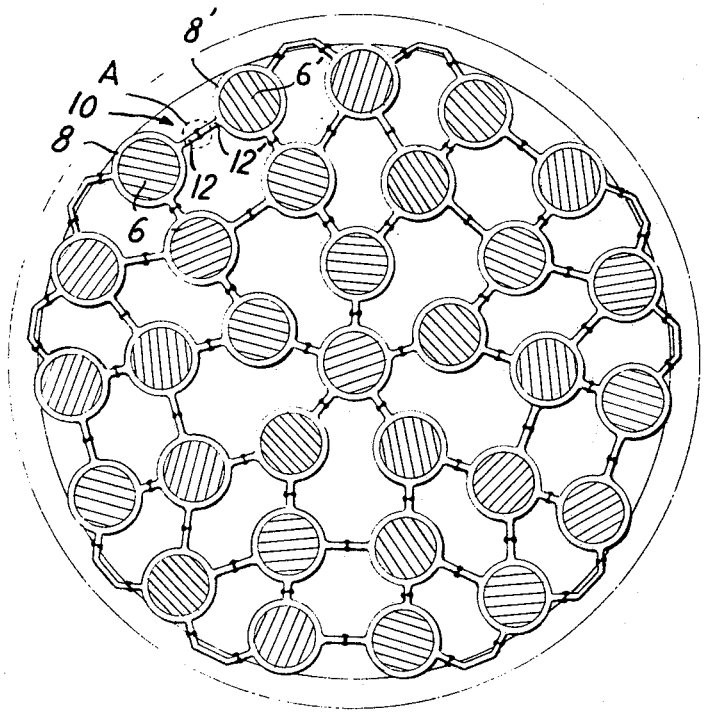
FIG. 1 is a diagrammatic view of a snow-crystal fuel cluster in accordance with the invention as shown in cross-section taken on a plane at right angles to the axis.

The nuclear fuel cluster which is shown in FIG. 1 is made up of a group of thirty-one fuel elements such as the fuel elements 6 and 6' which are spaced around a central fuel element on three co-axial circles. Each fuel element consists of a fuel rod enclosed in a can 8 or 8', the term "rod" being understood to mean a single fuel unit as well as a stack of separate pellets, the pellet stack being the design which is customarily employed in the case of ceramic fuels.

The fuel elements which form one ring are maintained at predetermined spatial intervals both relatively to each other and relatively to the fuel elements of the other fuel element rings by means of webs such as the web 10 which interconnects the fuel elements 8 and 8'. Each web which interconnects two fuel elements extends along the entire length of these latter and consists of two longitudinal fins such as the fins 12 and 12' which are each carried by a fuel element and located on a line of extension relative to each other, said fins being joined together by rigid coupling means which are preferably removable.

Each fuel element is provided in relation to adjacent fuel elements which form part either of the same fuel element ring or an adjacent ring with a number of finned connections such that the system is either isostatic or hyperstatic by one degree higher or lower in order to permit the possibility of taking up any play on assembly, the coupling means being considered as "articulations" between fuel elements. In the form of embodiment of FIG. 1, it can be seen that each fuel element is provided with at least three connections with the elements adjacent thereto.

In a first form of embodiment which is illustrated in

Figure 3:
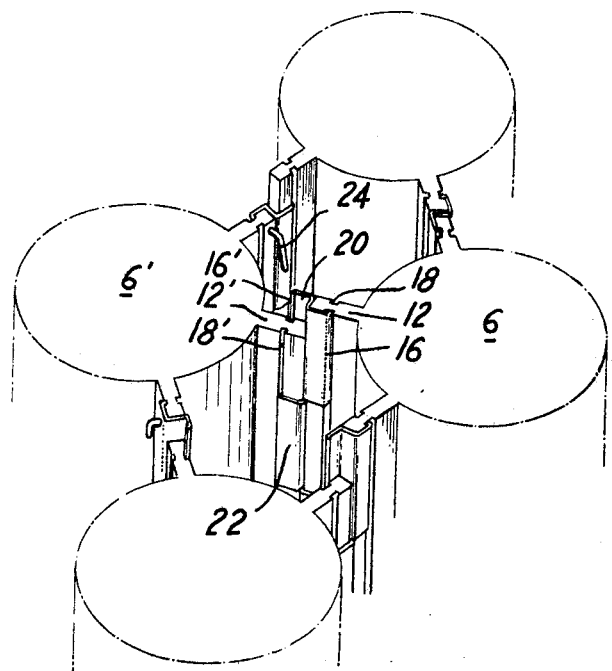

FIGS. 2a and 3, the coupling means between two fins consist of a member 14 which is interposed between the opposite terminal faces of the fins 10 and 10' and maintains them applied against each other.

In order to ensure that the fins are correctly applied against each other, the terminal portions of the fins may be planed if necessary. The terminal faces can either be flat (as shown in FIG. 2a) or have a curved transverse profile which is identical in the case of both fins.

The coupling member 14 which is shown in FIGS. 2a and 3 consists of a flat strip which is cut out and folded in the shape of an S. Flanges 16 and 16' which are formed at the extremities of the S are adapted to engage within longitudinal grooves 18 and 18' which are formed for this purpose along the lateral faces of the fins 10 and 10'. The arrangement of the coupling member 14 is reversed at regular intervals in such a manner as to ensure that each arm is coupled to the corresponding fin such as the fin 12', for example, on the one hand by means of portions 20 which are disposed on one side and, on the other hand, by means of portions 22 which are disposed on the other side.

A number of different materials of thin metallic sheet can be employed for the purpose of fabricating the coupling member 14. It is possible in particular to make use of 0.1 mm. stainless steel strip which has the advantage of being readily cut out and folded and of affording satisfactory corrosion resistance. Among the other materials which can be employed to advantage can be cited molybdenum, zirconium alloys, etc.

The coupling member 14 can be supported in the longitudinal direction in a number of different ways. In particular, said member can be secured to at least one of the fins by means of a locking pin 24 (as shown in FIG. 3). Provision can also be made for toothed portions of suitable shape which are placed at the ends of the fuel cluster.

In all cases, the fuel elements can readily be fabricated by extrusion, then machined if necessary. Assembly is also relatively simple; the fuel elements are placed in their relative positions and the coupling members 14 are then fitted over the fins.

FIGS. 2b and 2c show two variants of the embodiment which is illustrated in FIGS. 2a and 3. The coupling member 14 of FIG. 2b differs from the previous embodiment only in that it is folded so as to form alternate U sections. The coupling member of FIG. 2c makes use of two complete U sections which are welded back to back at 26.

The coupling members 14 which are shown in FIGS. 2a, 2b and 2c join the fins together externally thereof; on the contrary, FIGS. 4a, 4b and 4c show coupling members which form joints between fins within the actual thickness of these latter. The coupling member can be made up in particular of a tubular key 28 (as shown in FIG. 4a) having a transverse cross-section in the shape of a double T (as shown in FIG. 4b), in the shape of a double dovetail (as shown in FIG. 4c), etc.

In all cases, each key 28 is adapted to engage at the same time within two dovetail grooves 30 and 30' (as shown in FIG. 4a) each formed in the terminal face of one fin so as to maintain the two fins in contact with each other.

The keys 28 of double-dovetail configuration (as shown in FIG. 4c) or double T configuration (as shown in FIG. 4b) can be prepared by extrusion from a circular blank of stainless steel 0.8 mm. in diameter; the tubular keys (as shown in FIG. 4a) can be prepared from stainless steel tubing 5/100 mm. in thickness.

Generally speaking, the keys 28 can be formed by means of a number of different processes such as die-stamping, extrusion, etc., from the same materials as those already mentioned in connection with the coupling members 14. Said keys 28 can also be formed of materials which have lower neutron-absorption capacity but which are more difficult to shape such as, for example, beryllium.

As will be readily understood, the fuel element cluster can be provided with any suitable grappling means such as, for example, grooves formed in the ends of the fuel elements of the peripheral ring.

In a general sense, it is wholly evident that the invention is not limited solely to the forms of embodiment which have been illustrated and it must be understood that the scope of this patent extends to alternative forms of all or a part of the arrangements described which come within the scope of equivalent mechanical means.

What we claim is:

1. Fuel cluster assembly for heterogeneous nuclear reactor comprising a plurality of parallel fuel elements arranged in a plurality of concentric rows, each of said fuel elements comprising a cylindrical rod of fuel material, a can enclosing said rod and radially directed straight fins integral with said can and extending axially substantially along the full length of said fuel element, said fins of two adjacent fuel elements being arranged in pairs, and located in the same plane, keyways in said fins of each of said pairs of fins and removable key members axially slidable in said keyways for connecting said adjacent fuel elements.

2. Fuel cluster assembly as described in claim 1, said keyways being in the radially outer portions of said fins.

3. Fuel cluster as described in claim 1, said keyways being in the abutting edges of said fins.

4. Fuel cluster assembly as described in claim 2, said key members embracing said fins and shoulders on said key members engaging in said keyways.

5. Fuel cluster assembly as described in claim 3, said key members having a dovetail fit in said keyways.

References Cited
UNITED STATES PATENTS

| | | | |
|---|---|---|---|
| 2,898,280 | 8/1959 | Schultz | 176—81 X |
| 2,902,422 | 9/1959 | Hutter | 176—81 X |
| 3,085,964 | 4/1963 | Ritz et al. | 176—78 X |
| 3,128,235 | 4/1964 | Hackney et al. | 176—78 X |
| 3,142,627 | 7/1964 | Emerson | 176—78 |
| 3,161,571 | 12/1964 | Harrer et al. | 176—78 X |
| 3,205,148 | 9/1965 | Waine et al. | 176—78 |
| 3,231,476 | 1/1966 | Thome | 176—78 |
| 3,239,426 | 3/1966 | Waine et al. | 176—78 |
| 3,240,681 | 3/1966 | Waine et al. | 176—78 |

BENJAMIN R. PADGETT, *Primary Examiner.*

M. J. SCOLNICK, *Assistant Examiner.*